ated Feb. 16, 1971

United States Patent Office 3,564,561
Patented Feb. 16, 1971

3,564,561
TRIBOROHYDRIDE-8 SALT PREPARATION
Dorothy Ann Livingston Carvalho, Bridgeport, Conn., and Nestor W. Shust, Silver Spring, Md., assignors to American Cyanamid Company, Stamford, Conn., a corporation of Maine
No Drawing. Filed Nov. 16, 1962, Ser. No. 343,173
Int. Cl. C01b 6/20, 6/22
U.S. Cl. 23—358                          18 Claims This invention relates to a novel process for producing triborohydride-8 salts directly from pentaborane-9.

The previously known processes for preparing triborohydride-8 salts either were slow reactions requiring many hours to perform, were relatively inefficient in the utilization of the boron atoms contained in the starting material, were complex, multi-step processes, or required elaborate high vacuum techniques or more expensive starting materials.

The present invention prepares triborohydride-8 salts by a very rapid reaction which is a single-pot process and which is relatively efficient in the recovery of the boron atoms of the raw materials in the form of the desired product.

Briefly, the novel process for producing triborohydride-8 salts comprises reacting pentaborane-9 with a basic material in the presence of a liquid having the formula R—O—H wherein R is selected from the group consisting of hydrogen and lower alkyl radicals. The basic material may be strongly or weakly basic and may be such materials as the hydroxides, carbonates, bicarbonates, methoxys, and ethoxys of such cations as potassium, sodium, ammonium, barium, lithium, and tetramethylammonium. Also, the basic material may be such amines as triaminoguanidine. The liquid having the formula R—O—H may be selected from such as water, methanol, and ethanol. In some cases it may be preferred to use methanol or ethanol which had previously been dried over barium oxide and then decanted or filtered off. This reaction may be performed in a one-phase system or in a two-phase system containing additionally an organic liquid substantially immiscible with the previously defined liquid.

The products of the above reaction generally are useful either as rocket fuels, explosives, or gas generators, or as intermediates for preparing same containing the triborohydride-8 anion. Those salts containing this anion which have large amounts of nitrogen or carbon and hydrogen, such as triaminoguanidinium triborohydride-8, tetramethylammonium triborohydride-8, hydrazinium triborohydride-8, and ammonium triborohydride-8 would be useful as rocket fuels either alone, in combination with oxidizers, or in combination with nitrogen-containing materials. Other salts of triborohydride-8 may serve as intermediates for conversion to the aforementioned compounds by simple metathetic reactions.

In order to provide a better understanding of the nature of this invention, reference may be had to the following examples. It is to be expressly understood that the invention is not limited to the details recited in the following examples but is to be limited only in accordance with the subjoined claims.

EXAMPLE A

To a frozen solution of the basic material in water or alcohol at a temperature of about —95° C. to about —130° C., with or without other materials present, in a suitable vacuum-tight apparatus previously flushed with an inert gas, such as nitrogen, and now under high vacuum; approximately one milliequivalent of pentaborane-9 is added for every one milliequivalent of basic material present. After the addition of pentaborane-9 is complete, the reaction mass is permitted to warm up to room temperature with an accompanying evolution of hydrogen gas. When the gas evolution subsides (after about three milliequivalents of hydrogen gas have been evolved for each milliequivalent of pentaborane-9, which usually requires about one-half to five hours), the reaction to produce the triborohydride-8 salt is complete and the triborohydride-8 salt may be isolated or reacted further to produce derivatives thereof. While equivalent amounts of pentaborane-9 and basic material were illustrated above, other proportions were frequently tried and resulted in improved yields of triborohydride-8 salts.

Except where specifically noted, the foregoing procedure was used in each of the following numbered examples.

EXAMPLE 1

To a frozen solution (—95° C.) of 0.323 gm. (5 mmoles) of potassium hydroxide in 6.4 ml. water and 10 ml. n-hexane was added about 0.313 gm. (5 mmoles) of pentaborane-9 by vacuum line transfer procedure. The reaction mass was allowed to warm up to room temperature during which time 103 ml. of hydrogen gas was collected. To the reaction mixture was then added an excess of tetraethylammonium bromide in 10 ml. of water, under a nitrogen atmosphere, to precipitate the desired compound, tetraethylammonium triborohydride-8.

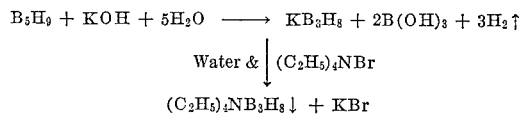

EXAMPLE 2

To a frozen solution (—95° C.) of 0.520 gm. (5 mmoles) of triaminoguanidine (TAG) in 6.4 ml. of water and 5 ml. of n-heptane was added about 0.313 gm. (5 mmoles) of pentaborane-9 by vacuum line transfer procedure. The reaction mass was allowed to warm up to room temperature with an evolution of 350 ml. of hydrogen gas. Evaporation of the solution gave a white residue which was extracted with acetone to give 0.257 gm. (35% of theoretical) of a white crystalline solid, $CH_9N_6B_3H_8$, melting at 72–78° C.

$$B_5H_9 + TAG + 6H_2O \rightarrow TAGHB_3H_8 + 2B(OH)_3 + 3H_2\uparrow$$

wherein TAG represents triaminoguanidine and TAGH represents the triaminoguanidinium ion.

EXAMPLE 3

To a frozen solution (—95° C.) of 5 ml. (5 mmoles) of tetramethylammonium hydroxide and 5 ml. of n-heptane was added about 0.313 gm. (5 mmoles) of pentaborane-9 by vacuum line transfer procedure, and the reaction mixture was allowed to warm up to room temperature. After approximately five hours, 545 ml. of hydrogen gas had been collected and a white precipitate had formed. The white solid was filtered off, washed with water and dried in vacuo. Yield: 0.310 gm. (54% of the theoretical).

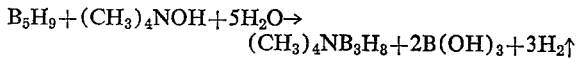

EXAMPLE 4

To a frozen solution (—95° C.) of 0.205 gm. (5 mmoles) of 97% sodium hydroxide in 5 ml. water and 5 ml. dioxane was added 0.313 gm. (5 mmoles) of pentaborane-9. Over a period of two hours the reaction mixture was allowed to warm up slowly with evolution of 590 ml. of hydrogen. Addition of 2.02 gms. (5 mmoles) of triphenylmethylphosphonium iodide gave 1.01 grams (64% of theoretical) of a white precipitate triphenylmethylphosphonium triborohydride-8, melting at 175–177° C.

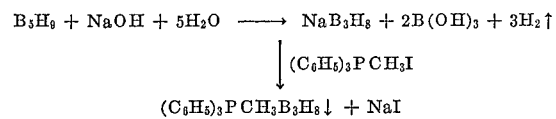

EXAMPLE 5

To a frozen solution of 6.45 ml. (10 mmoles) of 1.55 molar ammonium hydroxide was added 0.630 gm. (10 mmoles) of pentaborane-9. The reaction mixture was allowed to warm up to room temperature with continuous stirring. About 750 ml. of hydrogen was collected in an hour. Extraction of the solution with diethyl ether gave an ether-soluble material which was identified by infrared spectrum as ammonia triborane-7. Evaporation of the remaining water layer and extraction with liquid ammonia gave a white solid identified as ammonium triborohydride-8 by infrared spectrum.

(I) $B_5H_9 + NH_4OH + 5H_2O \rightarrow$
$NH_4B_3H_8 + 2B(OH)_3 + 3H_2\uparrow$ (II) $B_5H_9 + NH_4OH + 5H_2O \rightarrow$
$NH_3B_3H_7 + 2B(OH)_3 + 4H_2\uparrow$

EXAMPLE 6

To a frozen solution (−130° C.) of 0.600 gm. (5.07 mmoles) of sodium methoxide in 10 ml. of methanol was added 0.313 gm. (5 mmoles) of pentaborane-9. The reaction mixture was allowed to warm up to room temperature and after an hour 450 ml. of hydrogen had been evolved. The solution was evaporated to dryness, and redissolved in water. Addition of 2.02 gms. (5 mmoles) of triphenylmethylphosphonium iodide in 40 ml. water gave a white precipitate which was filtered, washed with water and dried in vacuo to yield 1.49 gms. (94% of the theoretical) of triphenylmethylphosphonium triborohydride-8, melting at 177–179° C.

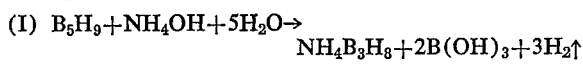
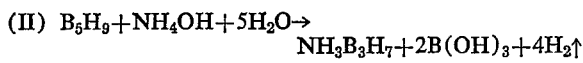

EXAMPLE 7

To a frozen solution of 4.61 mmoles of potassium methoxide in 10 ml. of methanol dried over barium oxide was added 0.313 gm. (5 mmoles) of pentaborane-9. Warming up to room temperature gave, in about three hours, 430 ml. of hydrogen. Evaporation of the solution to dryness and extraction of the white residue with tetrahydrofuran gave 0.140 gm. (43% of theoretical) potassium triborohydride-8.

$B_5H_9 + KOCH_3 + 5CH_3OH \rightarrow KB_3H_8 + 2B(OCH_3)_3 \pm 3H_2\uparrow$

EXAMPLE 8

Following the procedure of Example A, 0.313 gm. (5 mmoles) of pentaborane-9 was reacted with a frozen solution (−130° C.) that contained a large excess of barium methoxide in 10 ml. of methanol with an evolution of 430 ml. of hydrogen.

$B_5H_9 + \frac{1}{2}Ba(OCH_3)_2 + 5CH_3OH \rightarrow$
$\frac{1}{2}Ba(B_3H_8)_2 + 2B(OCH_3)_3 + 3H_2\uparrow$

EXAMPLE 9

Following the procedure of Example A, 0.313 gm. (5 mmoles) of pentaborane-9 was reacted with 0.346 gm. (2.5 mmoles) of potassium carbonate in 1.21 ml. (30 mmoles) of methanol in a two-phase methanol benzene environment.

$B_5H_9 + \frac{1}{2}K_2CO_3 + 6CH_3OH \rightarrow$
$KB_3H_8 + 2B(OCH_3)_3 + 3H_2\uparrow + \frac{1}{2}H_2CO_3$

EXAMPLE 10

To a frozen solution (−130° C.) of 10 ml. methanol saturated at room temperature with ammonia was added 0.626 gm. (10 mmoles) of pentaborane-9. In approximately thirty minutes, 1000 ml. of hydrogen was collected. Evaporation of the reaction mixture yielded 0.450 gm. of ammonium triborohydride-8 (79.5% of theoretical) identified by infrared and nuclear magnetic resonance.

$B_5H_9 + NH_3 + 6CH_3OH \rightarrow NH_4B_3H_8 + 2B(OCH_3)_3 + 3H_2\uparrow$

EXAMPLE 11

To a frozen solution containing 5 mmoles of sodium ethoxide in 9 ml. of ethanol and 6 ml. of ethanol dried over barium oxide was added 0.313 gm. (5 mmoles) of pentaborane-9. The mixture was allowed to warm up to room temperature with the evolution of 460 ml. of hydrogen. To the evaporated residue, then dissolved in water, was added 2.02 gms. (5 mmoles) triphenylmethylphosphonium iodide in 50 ml. of water. The precipitate was filtered, washed with water and dried in vacuo to yield 1.09 gms. (67% of theoretical) of triphenylmethylphosphonium triborohydride-8.

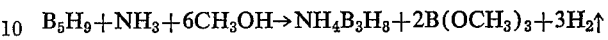
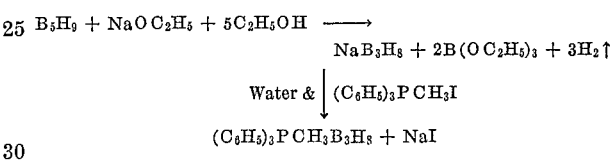

The products of the foregoing reactions may be identified by comparing infrared spectrum and nuclear magnetic resonance bands with those published in the literature for triborohydride-8 salts and also with samples of triborohydride-8 salts prepared by other procedures.

Thus, it has been shown that the present invention provides a novel process for producing triborohydride-8 salts by reacting pentaborane-9 with a basic material in the presence of an alcohol or water. While the foregoing examples illustrated certain specific details of the process, it is to be understood that the invention is not limited to such details except insofar as present in the subjoined claims.

We claim:

1. A process for producing triborohydride-8 salts comprising reacting pentaborane-9 with a basic material in the presence of a liquid having the formula R—O—H wherein R is selected from the group consisting of hydrogen and lower alkyl radicals.

2. A process as defined in claim 1 wherein said basic material is KOH.

3. A process as defined in claim 1 wherein said basic material is triaminoguanidine.

4. A process as defined in claim 1 wherein said basic material is $(CH_3)_4NOH$.

5. A process as defined in claim 1 wherein said basic material is NaOH.

6. A process as defined in claim 1 wherein said basic material is ammoniacal.

7. A process as defined in claim 1 wherein said basic material is $NaOCH_3$.

8. A process as defined in claim 1 wherein said basic material is $KOCH_3$.

9. A process as defined in claim 1 wherein said basic material is $Ba(OCH_3)_2$.

10. A process as defined in claim 1 wherein said basic material is $K_2CO_3$.

11. A process as defined in claim 1 wherein said basic material is $NaOC_2H_5$.

12. A process as defined in claim 1 wherein said liquid having the formula R—O—H is water.

13. A process as defined in claim 1 wherein said liquid having the formula R—O—H is methanol.

14. A process as defined in claim 1 wherein said liquid having the formula R—O—H is ethanol.

15. A process as defined in claim 1 wherein said liquid having the formula R—O—H is methanol dried over barium oxide.

16. A process as defined in claim 1 wherein said liquid having the formula R—O—H is ethanol dried over barium oxide.

17. A process as defined in claim 1 wherein said process is performed in a one-phase system.

18. A process as defined in claim 1 wherein said process is performed in a two-phase system containing an organic liquid substantially immiscible with said

R—O—H

References Cited

UNITED STATES PATENTS 3,453,092   7/1969   Hawthorne _____ 23—358

LELAND A. SEBASTIAN, Primary Examiner

U.S. Cl. X.R.

23—361, 363; 149—22; 260—462, 564, 567.6, 606.5